Dec. 18, 1951   C. J. AHRENS   2,579,355
CHICKEN ROOST
Filed Aug. 12, 1948
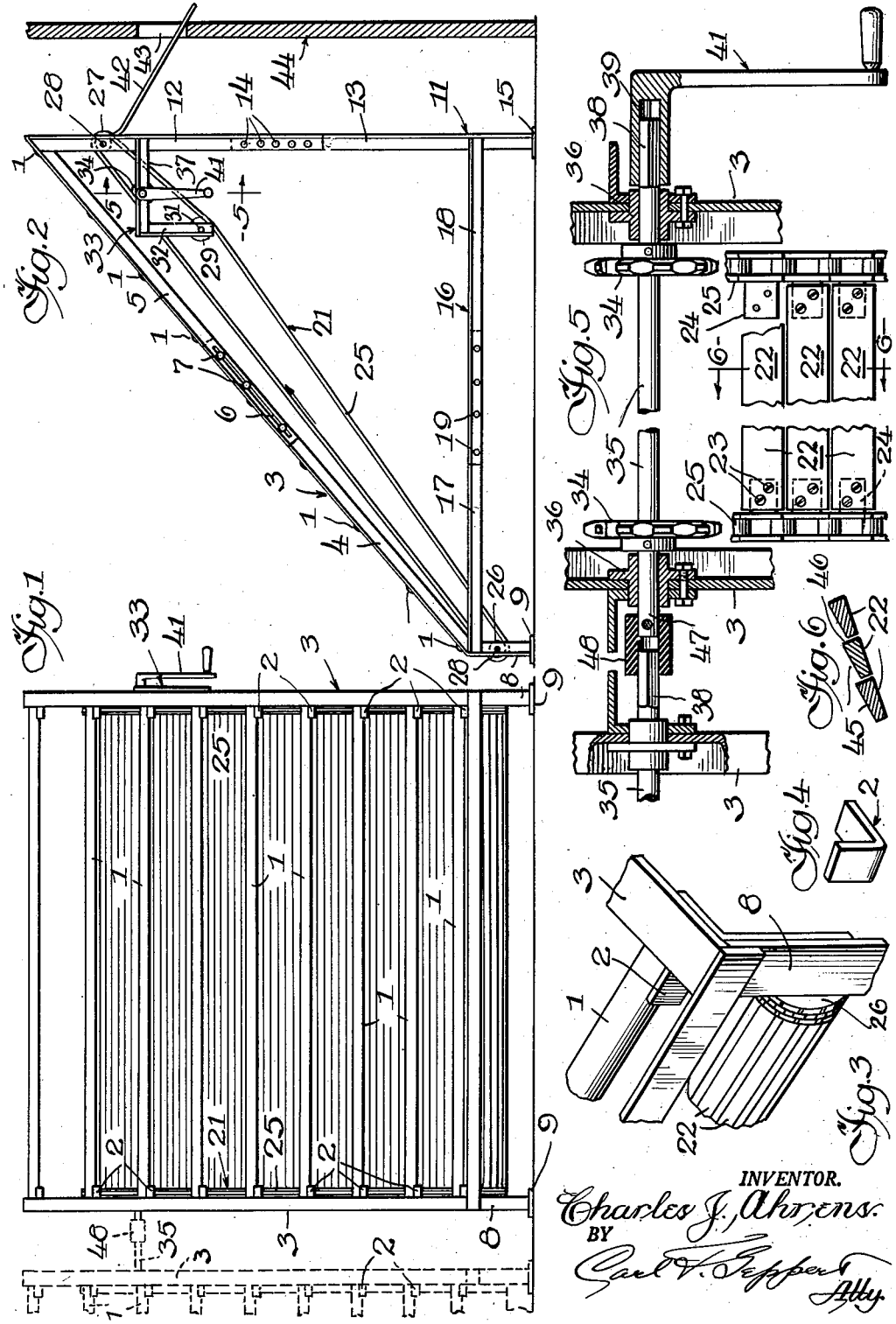
INVENTOR.
Charles J. Ahrens.
BY
Carl F. Geppert
Atty.

Patented Dec. 18, 1951

2,579,355

UNITED STATES PATENT OFFICE 2,579,355

CHICKEN ROOST

Charles John Ahrens, Norwood Park, Ill.

Application August 12, 1948, Serial No. 43,929

2 Claims. (Cl. 119—24)

The present invention relates to a chicken roost and especially to a novel construction and arrangement of a sanitary chicken roost so designed and constructed that it may be quickly assembled for use and maintained sanitary.

Among the objects of the present invention is the provision of a novel sanitary chicken roost having a plurality of poles or rods mounted in staggered and inclined relation and upon which the chickens perch or roost, and provided therebelow with an inclined apron formed of a plurality of relatively narrow slats or cross members so constructed as to provide a continuous partition or bed for intercepting all droppings from the roost and thereby maintain the floor beneath the roost clean, as well as provide space thereat for the chickens to scratch. By making such apron of closely spaced but individual slats extending completely across the roost and so contoured as to retain the droppings thereon until discharged by the attendant or operator, and attaching the ends of these slats to a pair of endless conveyor chains, the attendant or operator may readily clear and clean the apron by moving these chains and slats in a manner to discharge the droppings upon a chute or passage leading to the exterior of the chicken house.

The present invention further comprehends the provision of a sanitary chicken roost having a novel construction of articulated protective apron providing an endless conveyor beneath the chicken roost and from which the droppings or excrement may be quickly discharged.

The invention further comprehends a novel chicken roost of standardized construction which may be readily and easily erected, which is adjustable or extensible to permit and facilitate its fabrication in chicken houses of varying dimensions, and which may be erected in a single unit or in multiple units so connected that the articulated protective aprons of a plurality of units may be rotated in unison by a single attendant or operator.

Another object of the present invention is the provision of a novel chicken roost so designed and constructed as to effectively use all available space in the chicken house. Such use not only includes optimum space for roosting, but also protected space for scratching and for nests.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understand that the same is susceptible of modification and change, and comprehends other details, arrangements of parts, features and constructions without departing from the spirit of the invention.

In the drawing:

Figure 1 is a view in front elevation of the novel chicken roost and showing in dotted outline the manner of connecting the protective apron of two or more roosts or units so that they may be rotated or operated together by a single operator or attendant.

Fig. 2 is a view in end elevation of the novel chicken roost.

Fig. 3 is a fragmentary perspective view of the lower end of the roost and protective apron.

Fig. 4 is a view in perspective of one of the angle brackets for removably supporting an end of one of the poles or rods upon which the chickens roost or perch.

Fig. 5 is an enlarged fragmentary view, part in vertical cross-section and part in front elevation, and taken in a plane represented by the line 5—5 of Fig. 2, and showing the operating mechanism for the articulated, protective apron and the manner of connecting the operating shafts of adjacent roosts.

Fig. 6 is a view in vertical cross-section through adjoining slats of the protective apron and taken in a plane represented by the line 6—6 of Fig. 5.

Referring more particularly to the embodiment shown in the drawing and selected to illustrate my novel invention, the sanitary chicken roost comprises a supporting structure or framework upon which is mounted a plurality of spaced poles or rods 1 upon which the chickens roost, and which poles or rods are detachably retained at their opposite ends in angle brackets 2 suitably secured to a pair of inclined frame members or supporting bars 3. These inclined members are preferably formed of two angle irons 4 and 5 slotted at 6 for permitting ready adjustment in accordance with the space available in the chicken house, and locked in that adjusted position by bolts or other securing means 7.

The inclined members 3 are supported at their lower ends upon legs 8 which also are preferably constructed of angle irons with the lower end of each leg seating upon a base plate 9. At the upper ends the members 3 are mounted upon supporting legs 11 preferably formed in two sections 12 and 13 having their contiguous ends provided with spaced holes for receiving bolts or other securing means 14 for locking these sections together at the desired height. These sections 12 and 13 are also preferably formed or constructed of angle irons to give the desired strength and rigidity to the framework, and the lower ends of these legs are supported or seat upon base plates 15.

Suitable braces or cross members are provided at the sides and ends to give the required stability to the roost. As shown in Fig. 2, at each side is provided a brace 16 connecting the front and rear legs 8 and 11, respectively, and this brace is formed of adjustable sections 17 and 18 provided with spaced bolt holes and connected together by bolts or other securing means 19. Like the other frame members, these sections 17 and 18 are preferably formed or constructed of angle iron, and by making the inclined, horizontal and vertical frame members adjustable, the roost may be adjusted for height and width through a relatively wide range.

Disposed below the spaced poles or rods 1 of the roost is provided a protective apron 21 for intercepting any droppings or excrement from the roost. This apron is constructed of a plurality of closely spaced slats 22 completely bridging the roost and with each of the opposite ends of these slats riveted or secured at 23 to a plate 24 attached to a link of an endless chain 25 carried on sprockets 26 and 27 mounted upon and adjacent the ends of a shaft or rod 28 in the supporting legs 8 and 11. Each chain also passes over an idler sprocket or gear 29 mounted upon a shaft or rod 31 journalled in a leg 32 of a bracket 33.

To rotate these spaced chains 25 there is provided drive sprockets 34 pinned to a drive shaft 35 adjacent the opposite ends of this shaft, and with the ends of the shaft rotatably mounted in journals or bearings 36 carried in the horizontal legs 37 of the bracket 33, the horizontal legs 37 in turn being secured to and carried by the uprights or vertical legs 11. One end 38 of the drive shaft 35 is preferably squared or so formed as to be received and interengage in a complementary socket 39 of a crank 41 (see Fig. 5) whereby rotation of the crank in a clockwise direction rotates the shaft 35 and drive sprockets 34 which in turn moves the chains 25 in the direction of the arrow (see Fig. 2). These chains carry therewith the slats 22 and move them to a position adjacent to or in contact with a discharge chute 42 whereby the droppings or excrement will be scraped off or deposited upon this chute and discharged by gravity through an opening 43 to the exterior of the rear wall 44 of the chicken house.

The slats or cross members 22 are of substantially wedge shape in cross-section with the upper surface 45 thereof inclined from the front to the rear so as to provide a longitudinal shoulder or abutment 46 on each slat to prevent the droppings or excrement from moving by gravity downwardly over the entire surface of the apron, but rather each shoulder or abutment intercepts or provides a pocket across the apron for collecting therein the excrement.

The other end 47 of the drive shaft has pinned thereto a coupling or socket 48 for receiving and driving the end 38 of the adjoining drive shaft 35 of an adjacent unit, whereby the attendant may simultaneously operate the articulated aprons of two or more roosts or units.

From the above description and the disclosure in the drawing, it will be readily appreciated that the present invention comprehends a novel chicken roost of unique construction and provided with an articulated protective apron for maintaining optimum sanitation.

Having thus disclosed the invention, I claim:

1. A protective apron for mounting beneath a chicken roost comprising a conveyor system for collecting the excrement and including a conveyor chain at each side of the roost, a shaft adjacent the upper and lower ends of the roost and to which the chains are connected, slats having their opposite ends attached to the chains and their opposite edges in closely spaced relation to prevent discharge therebetween, said slats being substantially wedge-shaped in cross-section whereby the adjacent surfaces of adjoining slats provide pockets in which the excrement collects, and when the shafts and conveyor chains are operated to move the slats over the upper shaft these slats discharge the collected excrement.

2. An inclined protective apron for a chicken roost for receiving and collecting the excrement from chickens perched thereabove and including a plurality of closely spaced and elongated wedge-shaped members extending across the roost and each adapted to provide a substantially flat surface for collecting thereon the excrement, the rear edge of each member being of greater thickness than the forward edge and elevated to provide an abutment for preventing the excrement from discharging downwardly of these members by gravity and these members spaced sufficiently close together to prevent discharge therebetween, an endless conveyor chain at each side of the roost and means for mounting the opposide ends of said members upon the chains whereby movement of the chains carries along said members and as the chains change their direction of travel said members are tilted and discharge the collected excrement.

CHARLES JOHN AHRENS.

REFERENCES CITED

The following references are of record in the file of this patent:

UNITED STATES PATENTS

| Number | Name | Date |
|---|---|---|
| 595,121 | Dimock | Dec. 7, 1897 |
| 922,061 | Stoner | May 18, 1909 |
| 1,035,251 | Sladinska | Aug. 13, 1912 |
| 1,090,131 | Bowditch | Mar. 17, 1914 |
| 1,187,814 | Carter | June 20, 1916 |
| 1,206,149 | Siddall et al. | Nov. 28, 1916 |
| 1,556,578 | Baier | Oct. 13, 1925 |